Sept. 6, 1927.
G. F. COLLEY
1,641,474
RADIUS AND STEERING ROD SOCKET
Filed July 30, 1925  2 Sheets-Sheet 1
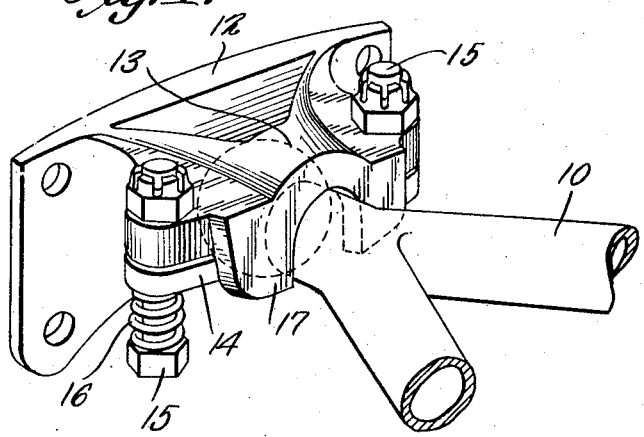
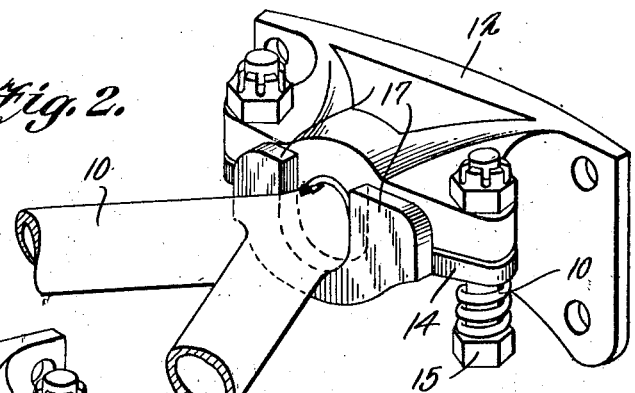
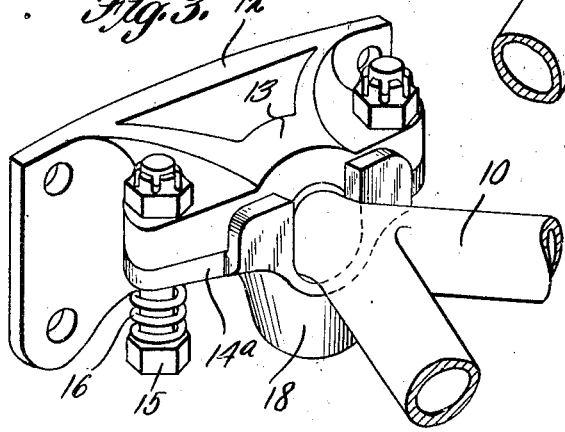
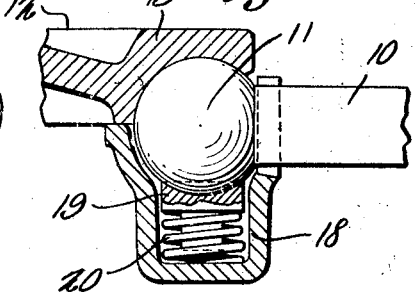
George F. Colley,
INVENTOR
BY Victor J. Evans
ATTORNEY
WITNESS:

Sept. 6, 1927.
G. F. COLLEY
1,641,474
RADIUS AND STEERING ROD SOCKET
Filed July 30, 1925
2 Sheets-Sheet 2
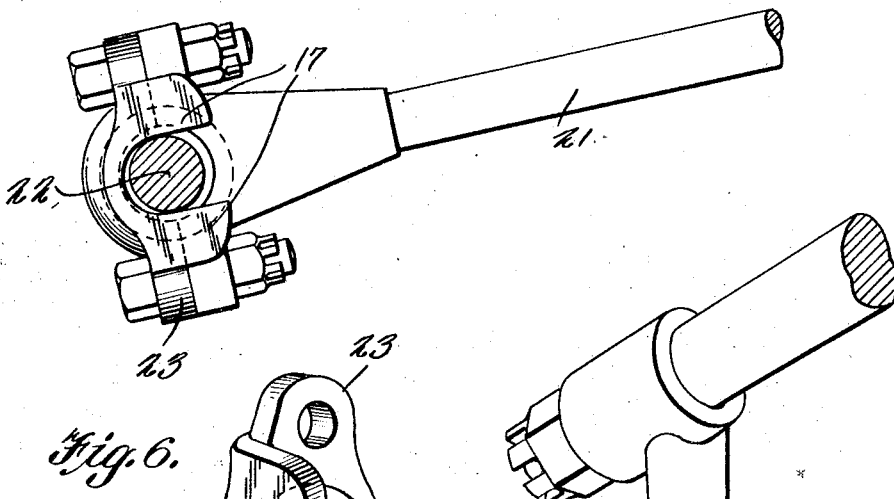
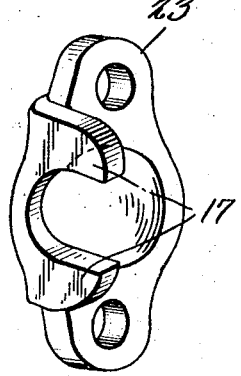
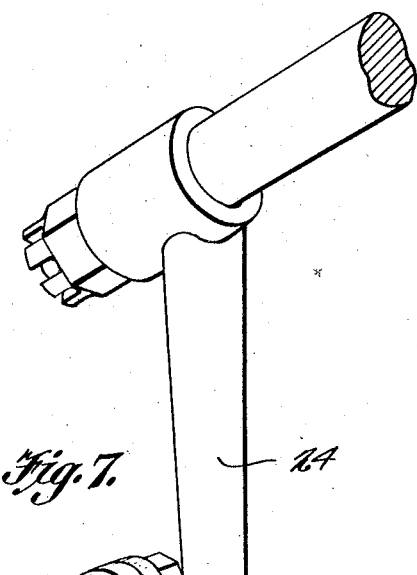
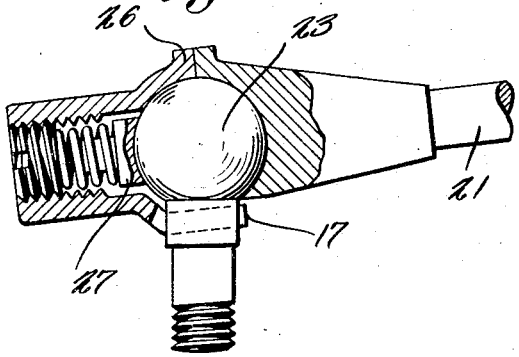
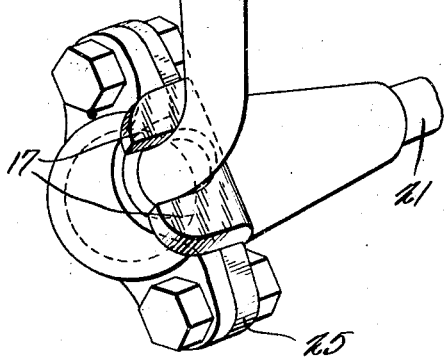
George F. Colley,
INVENTOR
BY Victor J. Evans
ATTORNEY
P. J. Hickey
WITNESS:

Patented Sept. 6, 1927.

1,641,474

UNITED STATES PATENT OFFICE.

GEORGE F. COLLEY, OF RICHMOND, VIRGINIA, ASSIGNOR TO HUGH H. WEEDON, OF RICHMOND, VIRGINIA.

RADIUS AND STEERING ROD SOCKET.

Application filed July 30, 1925. Serial No. 47,128.

This invention relates to improvements in ball and socket connections especially designed for use in mounting radius rods and providing connections between various parts of the steering mechanisms of automobiles, an object being to provide a socket member of sectional construction in which one of the sections is provided with an apron or lug upon opposite sides of the rod, which will resist tendency of the ball to leave the socket, yet permit of free relative movement.

With the above and other objects in view, the invention further includes the following novel features and details of construction, to be hereinafter more fully described, illustrated in the accompanying drawings and pointed out in the appended claims.

In the drawings:—

Figure 1 is a perspective view illustrating the invention in connection with an automobile radius rod.

Figure 2 is a similar view showing a slightly different form of the invention.

Figure 3 is a view of the invention applied to a different construction of socket.

Figure 4 is a section taken vertically through the socket illustrated in Figure 3.

Figure 5 is a fragmentary elevation showing the invention used for connecting the steering rod and the steering knuckle connecting rod.

Figure 6 is a detail perspective view of the cap shown in Figures 2 and 5.

Figure 7 is a fragmentary perspective view showing the invention used for connecting the steering rod and steering arm.

Figure 8 is a sectional view of the form of connection illustrated in Figure 5 with an anti-rattling device included.

Referring to the drawings in detail wherein like characters of reference denote corresponding parts, the reference character 10 illustrates a portion of a radius rod which carries at its end a ball 11, the latter being designed to be received within a socket 12 of substantially the type employed in an automobile of a well known make. This socket comprises a fixed member 13 and a removable member or cap 14, the latter being yieldingly secured to the fixed member by bolts 15 upon which are mounted springs 16.

All of the foregoing is of the usual construction, the invention residing in providing an apron or lug 17 upon opposite sides of the socket opening so that the edges of these lugs are positioned upon opposite sides of the radius rod. These lugs are carried by one member or section of the socket and overlap the outer edge of the other member or section and while permitting of free movement of the rod act to prevent accidental removal of the ball from the socket.

In Figure 1 the lugs 17 are carried by the fixed member 13, while in Figure 2, the lugs are carried by the cap 14.

In Figures 3 and 4 the lugs 17 are carried by the cap 14ª which is similar to the cap 14 of Figure 2, except that the cap 14ª is provided with a pocket 18 to receive an anti-rattling element 19 held in contact with the ball 11 by a spring 20.

In Figure 5 the invention is used in connection with the universal joint between a steering rod 21 and the steering knuckle connecting rod of a steering mechanism, the said connecting rod having secured thereto a threaded stud 22 which carries a ball 23. In this figure, the lugs 17 are carried by the fixed member 23 which is illustrated in detail in Figure 6 of the drawings.

In Figure 7 the invention is shown in connection with the universal joint between the steering arm 24 and steering rod 21, the lugs 17 being carried by the removable member or cap 25.

In Figure 8, the cap 26 which carries the lugs 17, also carries an anti-rattling element 27.

The invention is susceptible of various changes in its form, proportions and minor details of construction and the right is herein reserved to make such changes as properly fall within the scope of the appended claims.

Having described the invention what is claimed is:—

1. In a ball and socket connection, a socket section, a cap section, the sections having matching recesses, a ball member having a ball and a shank, the ball of the ball member seating in the said recesses, means yieldably connecting the sections for limited relative separation, and spaced lugs carried by one of said sections and embracing the shank of the ball member adjacent the ball and extending across the juncture of the two sections beyond the center of the shank of the ball member.

2. A ball and socket connection comprising mating sections for engaging a ball member including a shank and a ball carried thereby, said sections having opposed faces provided with ball-receiving seats to embrace the ball of the ball member and having recesses forming an opening communicating with the seats and adapted to accommodate the shank of the ball member, means connecting the sections together, and lugs upon one of said sections at opposite sides of the recess therein adjacent the seat to straddle the said shank and overlap the other section with their free ends extending beyond the center of the opening.

In testimony whereof I affix my signature.

GEORGE F. COLLEY.